Patented Feb. 9, 1932

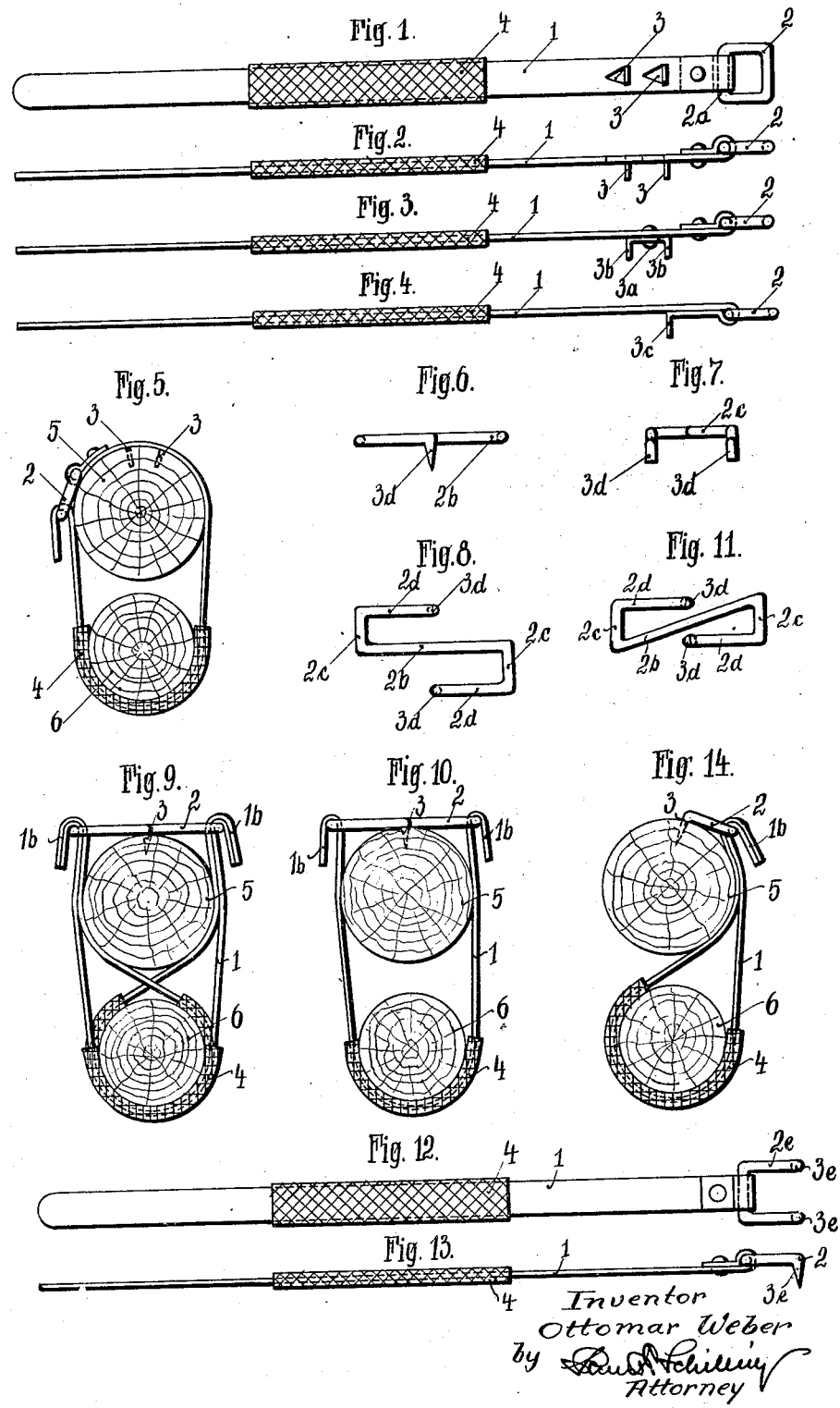

1,844,024

UNITED STATES PATENT OFFICE

OTTOMAR WEBER, OF RATHEN-ON-THE-ELBE, GERMANY

MEANS FOR FASTENING TREES TO PROPS

Application filed May 29, 1928, Serial No. 281,400, and in Germany June 3, 1927.

This invention relates to a device for binding the stem of a tree to a stake and relates to that class of device consisting of a flat metal strap having a slot at one end through which the loose end of the strap is passed after the strap has been passed around the tree stem and stake to bind them together.

Various other devices have already been proposed for the purpose, but they have all more or less some deficiency or they are so expensive that it has not been possible to introduce them on the market. The device should have a firm immovable seat on the stake and be capable of easy adjustment. The material must be able to stand wear at least as long as the tree needs support. Furthermore, all damage to the stem of the tree must be avoided, i. e., the fastening-contrivance must be flexible within certain limits, according to the growth of the tree, being at the same time able to stand all strain due to storm or wind. It must be possible to apply the fastening-contrivance easily and reliably, if possible, without the aid of tools, and further to remove it just as easily and to repeatedly make use of it for the same purpose. Lastly, the contrivance should be as cheap as possible.

The present invention fulfills all the above demands and consists in a device of the class described comprising a flat metal strap having a looped connector link permanently or loosely attached to one end of the strap in combination with one or more spikes extending inwards from the connector link or from the link end of the strap. The said spikes are forced into the stake and the loose end of the strap is passed through the connector link to form a slip-knot after the strap has been passed around the tree stem and stake to bind them together.

I am aware that a scaffold pole clamp has been suggested consisting of a length of wire screw-threaded at one end which is passed through a loop at the other end of the wire and secured by a nut after the wire has been passed around the poles; the end of the loop forming a spike.

In carrying out the present invention, the connector link is made for preference of wire and loosely or permanently hung to the strap, and one or more sharp spikes are situated on the connector link or on the strap immediately near the connector link. These spikes, which are preferably formed of flat metal, may be produced by stamping out the material of the strap, or by riveting a U-shaped metal bracket with spurs, spikes or points on the strap. It would, however, also be possible to let the strap end in a sharp point bent at right angles, subsequently slinging this end round one stay of the link and bending it back. Alternatively, the link itself may carry the spikes. The link need not necessarily be an endless one. It is also possible to give it the form of an S-shaped or looped connector stirrup, the free ends of which are prolonged to about the middle of the central bar and terminate in sharp points bent back at right angles. If the parallel limbs of the S-shaped stirrup are made at right angles to the central bar, then with such a stirrup two straps at different height and not interfering with one another may be employed.

The accompanying drawings illustrate different possible ways of constructing the fastening according to this invention.

Fig. 1 shows the plan view of a strap.

Fig. 2 shows the strap seen at right angles to Fig. 1.

Figs. 3 and 4 show other possibilities of placing the spikes.

Fig. 5 shows the strap of Fig. 1 applied to a tree.

Figs. 6, 7 and 8 show side and plan views of a stirrup bent approximately to S-shape and suitable for use in place of a link.

Fig. 9 shows this stirrup in use.

Fig. 10 shows the stirrup of Fig. 11 applied to a tree.

Fig. 11 shows another form of S-shaped stirrup necessitating only one strap.

Figs. 12 and 13 are plan and side views of a strap of somewhat different construction, where instead of the link a U-shaped stirrup having its free ends bent back at right angles is employed.

Fig. 14 shows the adaptation of this strap to a special purpose.

In all the drawings, like parts have like numbers. 1 is the strap, 2 is the looped connector link or stirrup, 3 are the sharp spurs, spikes or points, 4 is the covering of the strap, 5 is the prop and 6 is the tree.

According to Fig. 1 the strap 1 is fastened to a rectangular link connector 2 made of wire, etc. It carries the spikes 3 produced by stamping and bending, and a piece of movable tubular fabric 4.

It is of course also possible to rivet to the strap 1 or to connect with it by other means (Fig. 3) an independent piece 3a carrying spikes 3b. This construction will be preferred especially where one wishes to employ thin, flexible material, the rigidity of which is not sufficient for forming the spikes. Another possibility is to form one end of the strap 1 into a spike 3c (Fig. 4) folded or bent back at right angles about the connector link-part 2a, both parts of the fold being firmly connected by means of a rivet or other suitable fastening. This is however not absolutely necessary.

The spikes 3b, 3c formed of flat material and in this case placed immediately next to the link 2 offer the advantage of great rigidity. For the purpose of fastening a tree 6 to its stake 5, the spike carried by the connector link 2 of the strap 1 is firmly pressed into the stake 5. This can be done without difficulty as the plane of the metal spike is parallel to the grain of the wood. Owing to its plane surface, the spike 3, 3b, 3c which has been pressed into the grain of the wooden stake 5 cannot turn in the wood. The tubular fabric is then moved into the proper position on the strap, and the free end of the strap put through the link 2 (Fig. 5) and bent backwards, where it can be locked by a movable ring or other suitable locking member (not shown in the drawings) if regarded necessary. Where quick growing of the tree may be presumed, it is advisable to omit this ring, enabling the growing tree to gradually bend back the loop, preventing damage to itself. The straps described above serve mainly for fastening young trees, e. g., for high-grown berry-trees and bushes, roses, vines etc., whereas the straps described hereinafter are intended for trees with large, heavy tops.

In place of a link 2 a looped stirrup connector of approximately S-shape (Figs. 8 and 11) may be employed. The free ends 2d of this stirrup, being continuations of the parallel limbs 2c, are prolonged nearly up to the middle of the centre bar 2b and issue into flattened spurs or spikes 3d bent back at right angles. The parts 2b, 2c, 2d form a U-shaped loop at each end of the strap. Whilst in Fig. 8 the parallel limbs 2c are at right angles to the centre bar 2b, allowing two straps 1 to be fixed at different levels and without interfering with one another, Fig. 11 shows a construction where both limbs 2c lie at the same height, there being in this case only one strap 1 necessitated. The advantage due to the employment of a stirrup according to Fig. 8 may be clearly seen from Fig. 9. There, one strap leaves the left limb 2c of the stirrup, passing the stake 5, going round the tree 6 and returning back to the original limb. In the same manner a second strap leaves the right limb 2c of the stirrup, passing the stake 5, going round the tree 6 and returning back to the original limb. It will be readily understood that such a connection will be exceedingly firm. Any movement of the tree 6 about its prop 5 as generally possible with known tying-means is impossible.

In such cases where it is only desired to draw the tree up to its stake, a looped connector stirrup according to Fig. 11 will be used to advantage, same being easily bent to the right shape from the stirrup shown in Fig. 8. If such a stirrup is used as shown in Fig. 10, then the advantage will be gained that the stirrup, owing to the gradually increasing diameter of the tree, will be able to follow the movement, i. e., it will bend about its centre part resting on the rounding of the stake 5 and carrying the spikes 3d. In the same way the loops 1b on the limbs 2c will give way to some extent.

If it is desired to straighten a tree, i. e., to force a piece of crooked growth between two tyings performed according to Fig. 9, then it is of advantage to employ instead of a link a U-shaped stirrup loop 2e with spikes 3e according to Figs. 12 and 13. The fastening is performed in the same way as with the separate straps of the connection in Fig. 9.

It will easily be recognized that the contrivance provides a most simple and cheap means for the purpose, and that it may easily be adapted to all requirements.

Fig. 14 shows a construction in which the band is passed about a tree and the ends of the band brought together, arranged to bear against one side of the stake and passaged through a looped (U-shaped) connector link or staple and then bent back upon themselves, as shown. This arrangement makes a firm connection while permitting slippage of the strap to accommodate itself to the growth of the tree, as will be readily understood.

Claims:

1. A device for binding the stem of a tree to a stake comprising a readily bendable metal strap, a substantially S-shaped wire connector adapted to be arranged to bear against the stake and having each of its looped ends provided with a spike projecting therefrom to enter the same, said strap adapted to be passed about the tree stem and engaged at its ends with said connector.

2. A device for binding the stem of a tree to a stake comprising a substantially S-shaped wire connector adapted to bear against the stake, a readily bendable metal strap adapted to be passed about the tree stem and having a slip connection with the connector, and a spike on each end of the connector adapted to be driven into the stake for fastening the connector thereto.

3. A device for binding the stem of a tree to a stake comprising a connector adapted to bear upon a stake and having looped end portions, a metal strap adapted to be passed about the tree stem and having its ends engaged with the looped ends of the connector and bent backwardly upon themselves, and a spur on the connector to enter the stake and fasten the connector thereto.

4. A device for binding the stem of a tree to a stake consisting of a pair of members, one of which forms a readily bendable tree supporting strap and the other of which forms a connector for the ends of said strap, one of said members being provided with a flattened spur extending from the member to enter a stake and arranged transversely of the longitudinal center line of the member from which said spur extends.

OTTOMAR WEBER.